United States Patent
Whelan et al.

(10) Patent No.: US 9,529,081 B2
(45) Date of Patent: Dec. 27, 2016

(54) USING FREQUENCY DIVERSITY TO DETECT OBJECTS

(71) Applicant: The Boeing Company, Chicago, IL (US)

(72) Inventors: David A. Whelan, Newport Beach, CA (US); David Lynch, Jr., Henderson, NV (US); Eric B. Jensen, Hermosa Beach, CA (US)

(73) Assignee: The Boeing Company, Chicago, IL (US)

( * ) Notice: Subject to any disclaimer, the term of this patent is extended or adjusted under 35 U.S.C. 154(b) by 879 days.

(21) Appl. No.: 13/856,413

(22) Filed: Apr. 3, 2013

(65) Prior Publication Data

US 2016/0103216 A1    Apr. 14, 2016

(51) Int. Cl.
| | |
|---|---|
| G01S 13/00 | (2006.01) |
| G01S 13/90 | (2006.01) |
| G01S 7/292 | (2006.01) |
| G01S 7/41 | (2006.01) |
| G01S 13/22 | (2006.01) |
| G01S 13/24 | (2006.01) |
| G01S 13/28 | (2006.01) |

(52) U.S. Cl.
CPC .............. *G01S 13/90* (2013.01); *G01S 7/2923* (2013.01); *G01S 7/414* (2013.01); *G01S 13/22* (2013.01); *G01S 13/24* (2013.01); *G01S 13/28* (2013.01); *G01S 2013/9058* (2013.01); *G01S 2013/9064* (2013.01)

(58) Field of Classification Search
CPC ........... G01S 13/24; G06T 17/00; G06T 17/05
USPC .......................................................... 342/25
See application file for complete search history.

(56) References Cited

U.S. PATENT DOCUMENTS

| | | | |
|---|---|---|---|
| 8,044,846 B1 * | 10/2011 | Urkowitz .............. | G01S 7/2923 342/104 |
| 2005/0135664 A1 * | 6/2005 | Kaufhold .............. | G06T 11/006 382/131 |
| 2009/0102705 A1 * | 4/2009 | Obermeyer ............. | G01S 13/90 342/25 F |

(Continued)

FOREIGN PATENT DOCUMENTS

| | | | |
|---|---|---|---|
| JP | 60257380 A | * | 12/1985 |
| JP | S60-257380 A | | 12/1985 |

OTHER PUBLICATIONS

Winter et al.; "Aircraft Integrated Monitoring Systems"; Proceedings of the 17$^{th}$ Symposium; Sep. 21-23, 1993; p. 3 and p. 617-627.

(Continued)

*Primary Examiner* — Timothy A Brainard
(74) *Attorney, Agent, or Firm* — Baker & Hostetler LLP

(57) ABSTRACT

Technologies for detecting a passive object through the use of frequency diversity to find at least a resonant peak are disclosed. For example, a radar system may illuminate a suspect area with a pulsed radio wave based on a large number of frequency bands and based on parameters associated with the passive object. The reflected radio wave may be processed to generate synthetic aperture radar (SAR) maps associated with the frequency bands. The SAR maps may be analyzed and compared to determine large deviation amplitudes that may indicate a location of the passive object.

20 Claims, 7 Drawing Sheets

(56) References Cited

U.S. PATENT DOCUMENTS

2012/0086606 A1* 4/2012 Mathews ............. G01C 21/165
   342/461

OTHER PUBLICATIONS

Preiss et al.; "Coherent change detection: theoretical description and experimental results"; No. DSTO-TR-1851. Defence Science and Technology Organisation Edinburgh (Australia), Aug. 2006; 116 pages.
Great Britain Patent Application No. 1403936.6; Examination Report; dated Apr. 24, 2015; 2 pages.

* cited by examiner

USING FREQUENCY DIVERSITY TO DETECT OBJECTS

FIELD

The present disclosure relates to employing radar-based techniques, such as synthetic aperture radar (SAR) mapping, to detect passive objects.

BACKGROUND

Electro-optical techniques have been used in detecting objects or targets. For example, an imaging system can be fitted on an aircraft that flies by an area containing an object. The imaging system may optically capture images of the area, which may be subsequently analyzed to determine the existence and location of the object. Typically, this analysis is slow and labor-intensive as it requires the images to be searched by a combination of machine and human image analysts. Additionally, the images may not capture the object in some unfavorable environmental conditions such as clouds, rain, snow, or at night time.

Imaging using radio frequency (RF) energy has also been traditionally employed. For example, the imaging system may employ synthetic aperture radar (SAR) and inverse SAR techniques to generate geospatial maps or images from RF energy. SAR is a form of radar that uses the relative motion between an antenna of the imaging system and the object to provide distinctive long-term coherent-signal variations that are exploited to obtain finer spatial resolution than is possible with conventional beam-scanning systems. The waveforms received successively at the different antenna positions are coherently detected, stored, and processed together to detect the object in an image of the area.

The use of such SAR techniques may be limited by the structure or dimensions of the object. For example, the signature of a large non-radiating object, such as a very high frequency (VHF) passive antenna array, may have a minimal amplitude deviation as compared to other elements in the area and may render the object almost invisible in a SAR map.

SUMMARY

Methods, computer readable media, and systems for detecting objects using frequency diversity change detection are disclosed. Embodiments of techniques in accordance with the present disclosure may advantageously improve detection of objects, including non-radiating large structures, in favorable and unfavorable environmental conditions.

In an embodiment, a detection system is described. The detection system may include a radar transmitter configured to transmit a first signal representative of a plurality of frequency bands. Each frequency band may be at an interval from another frequency band based on a range resolution. The plurality of frequency bands may form a bandwidth that causes a variation of a scatterer in a radar map. The detection system may further include a radar receiver configured to generate a plurality of synthetic aperture radar maps based on a second signal representative of a reflection of the first signal. Each synthetic aperture radar map may be associated with a frequency band from the plurality of frequency bands. The detection system may also include signal processing circuitry configured to detect a passive object based on a first synthetic aperture radar map representative of the plurality of synthetic aperture radar maps and a contribution of a second individual synthetic aperture radar map to the first average synthetic aperture radar map.

In another embodiment, a method of generating a synthetic aperture radar image is described. The method may include determining a range resolution based on the dimension of a passive target and determining the number of frequency bands based on a predetermined frequency diversity. Each frequency band may be at an interval from another frequency band based on the range resolution. The method may also include transmitting a signal at a pulse repetition interval, the signal being based on the number of frequency bands. The signal may further cause the synthetic aperture radar image to be generated based on a plurality of processed synthetic aperture radar images in response to the transmitted signal. Each processed synthetic aperture radar image may be associated with a frequency band.

In yet another embodiment, a computer-readable storage medium may comprise instructions that cause generation of a plurality of radar-based maps. Each radar-based map may span a frequency band that is at a predefined interval from a frequency band associated with another radar-based map. The plurality of radar-based maps may map an area within a predefined duration. The instructions may also cause determination of a retroreflection associated with an object based on a comparison of the plurality of radar-based maps.

The features, functions, and advantages can be achieved independently in various embodiments or may be combined in yet other embodiments further details of which can be seen with reference to the following description and illustrations.

BRIEF DESCRIPTION OF THE DRAWINGS

Embodiments of techniques in accordance with the present disclosure are described in detail below with reference to the following illustrations. Throughout the drawings, reference numbers may be re-used to indicate correspondence between referenced elements.

DESCRIPTION

Figure 1:
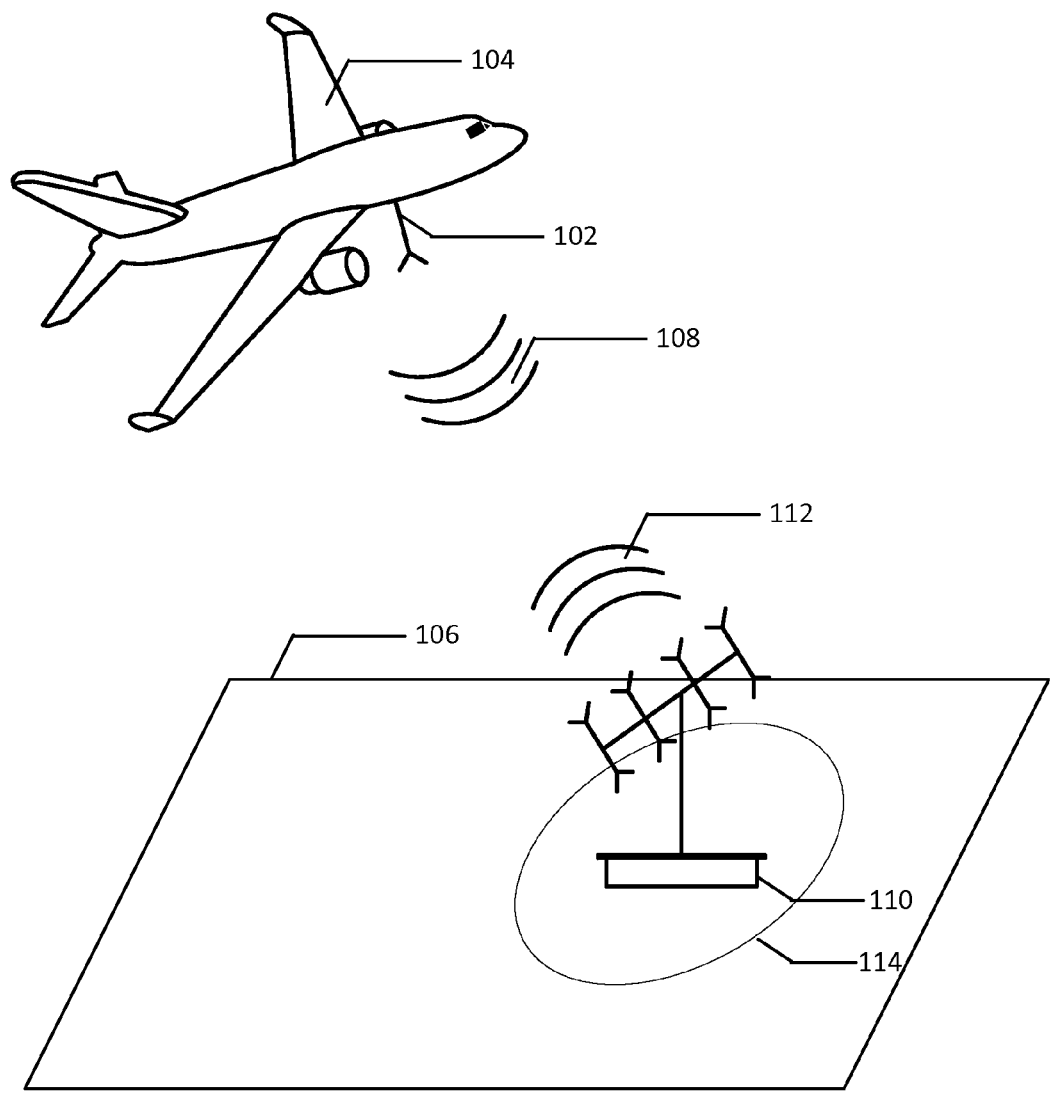
FIG. 1 is an illustration of an example radar system in accordance with an embodiment of the disclosure.

Techniques for detecting and geo-locating objects, such as passive structures, are described herein. Specific details of embodiments of the present disclosure are set forth in the following description and in FIGS. 1 through 8. The various techniques described herein can be implemented in hardware, software, or a combination thereof. In the figures, similar symbols identify similar components, unless context dictates otherwise. Certain well-known technology details, such as computing and software technologies, are not set forth in the following description to avoid unnecessarily obscuring the various embodiments. Those of ordinary skill in the relevant art will understand that they can practice other embodiments of the disclosure without departing from the scope of the subject matter presented herein.

Generally, the techniques described herein allow detection of objects, including non-radiating large structures, in favorable and unfavorable environmental conditions. By way of example, the techniques involve a simultaneous or near-simultaneous generation of a large number of low-resolution synthetic aperture radar (SAR) maps, each SAR map spanning a band of frequency that is spaced at a predetermined offset or interval from a band of frequency of another SAR map, and the large number of SAR maps covering a large bandwidth, such as 1.5:1 or 2:1. This frequency diversity increases the probability that, at some frequency within the bandwidth, a coherent retroreflection of a passive object occurs. The coherent retroreflection may represent a quasi-resonance at a certain frequency and may be associated with a large amplitude deviation as compared to retroreflections at other frequencies within the bandwidth. These characteristics may be represented as a bright dot in the SAR map that is associated with the resonant frequency and in, potentially, a second SAR map at a nearby frequency. Other than the bright dot at the location of the object, the remainder of the SAR map may be likely identical or similar, except for contributions from random noise, to SAR maps at nearby frequencies allowing image processing techniques described herein to be applied for an easy, rapid, and automatic detection of the object and its location. The techniques enable quick search of large areas that would otherwise be impractical to search.

The comparison of SAR maps can use non-coherent and coherent change detections that compare SAR images for inconsistencies. Non-coherent change detection may identify changes in the mean backscatter power of an imaged area, radar pixel by radar pixel, by comparing sample estimates of the mean backscatter power taken from a SAR relative to an ensemble average of a plurality of maps. Typically, the sample estimates may be obtained by spatially averaging the image pixel intensities or amplitudes squared over local regions in the map pair. Coherent change detection, on the other hand, may identify changes in both the amplitude and phase of the imaged area using sample coherence change statistics and may detect very subtle scene changes to a sub-resolution region scattering structure that may be undetectable using non-coherent techniques.

FIG. 1 is an illustration of an example radar system imaging an area that contains an object, or a target object (e.g., an object that the radar system is configured to detect. The target object may be referred to herein as the "object") in accordance with an embodiment of the disclosure. The described radar system may implement radar-based techniques such as SAR. As shown in FIG. 1, a radar system 102 may be mounted to an aircraft 104 that flies over a region or area 106. The radar system 102 may be configured to generate a large number of SAR maps of the area 106 during predefined and short periods of time, such as approximately a time period of one minute or less, to simplify motion compensation and image rectification. To generate the SAR maps, the radar system 102 may configure pulses of radio waves 108 based on, for example, the aircraft 104 velocity, antenna beamwidth, desired range coverage, predefined frequency diversity, and the like, and may transmit the pulses that may bounce off an object 110 in the area 106. The object 110 may reflect pulses of radio waves 112 back to the radar system 102 as fractions of energy of the radio waves 108.

The radar system 102 may also be associated with a range resolution 114 that may be set to a desired range resolution that matches dimensions of the object 110 such as its physical extent or its resonant structure. For example, the object may include an array of non-radiating very high frequency (VHF) antenna elements susceptible to frequencies in the 200 MHz range. Although FIG. 1 shows an array of four antenna pairs, the object 110 is not limited to that number. For instance, the array may include a plurality of antenna elements which correspond to a structure of approximately twenty meters or sixty-six feet. The range resolution 114 can be set to at least this dimension and can, in turn, be used in configuring the pulse repetition interval (PRI) of the pulsed radio waves 108. The PRI can be set such that pulses of radio waves 108 may be outside the range extent of the radar system 102 antenna beamwidth on the surface covering the area to be searched 106 and high enough to avoid a Doppler sampling ambiguity inside the antenna beamwidth on the surface. In this instance, a PRI lying in the interval between 0.1 to 2 milliseconds may be used.

The design and structure of the radar system 102 may take advantage of the harmonics of the object's operating frequency. Not all harmonically related responses may be equally large. Typically, frequencies related to odd harmonics may often be larger than even harmonics. For example, the sixty-six foot array of VHF antennas may have the largest radar cross section (RCS) related to, but not necessarily the same as, the third and fifth harmonics of its operating frequency. However, significant resonances may also exist at the seventh and ninth harmonically related frequencies. Also, the radar system's antenna support structure, which may be independent of the exact operating frequency, may have dimensions driven by some multiple of the band of operating wavelengths. Often, the support structure may be the major contributor to the RCS outside of the operating band. Thus, the use of the higher harmonic frequencies, such as the seventh and ninth harmonics, may allow the radar system 102 to operate at a higher SAR frequency, which may render the radar system 102 easier to design and deploy.

Although FIG. 1 shows the radar system 102 as mounted to the aircraft 104, other mounting platforms may be used. These platforms may include a spacecraft platform or, without any limitation, any moving vehicle or vessel such as a satellite, a missile, artillery, a ship, a ground vehicle, and the like. In circumstances where the object is a moving target, the platform may be stationary, such as a radar tower, and the radar system 102 may be configured to implement inverse SAR techniques. Also, the object 110 is not limited to what is shown in FIG. 1. A number of similar or different passive objects may be detected including, for example, high frequency (HF) and ultra-high frequency (UHF) non-radiating array antennas of various dimensions, shapes, and arrangements.

The radar system 102 may be mounted to, for example, a side of an unmanned aerial vehicle (UAV) and its components or functionalities may be integrated with the systems of the UAV such as the onboard avionics system. The components or functionalities may also be distributed. For instance, the radar system 102 may be configured to store raw data associated with the SAR maps on an onboard server and to transmit over a wireless channel the raw data to a control or data center (not shown in FIG. 1) for processing. In turn, the data center may process the received data to generate and analyze the SAR maps and to detect the object 110. This distribution may also include the use of a plurality of moving platforms. For example, a transmitter of the radar system 102 may be installed on a ship vessel while a receiver of the radar system 102 may be installed on a satellite.

Figure 2:
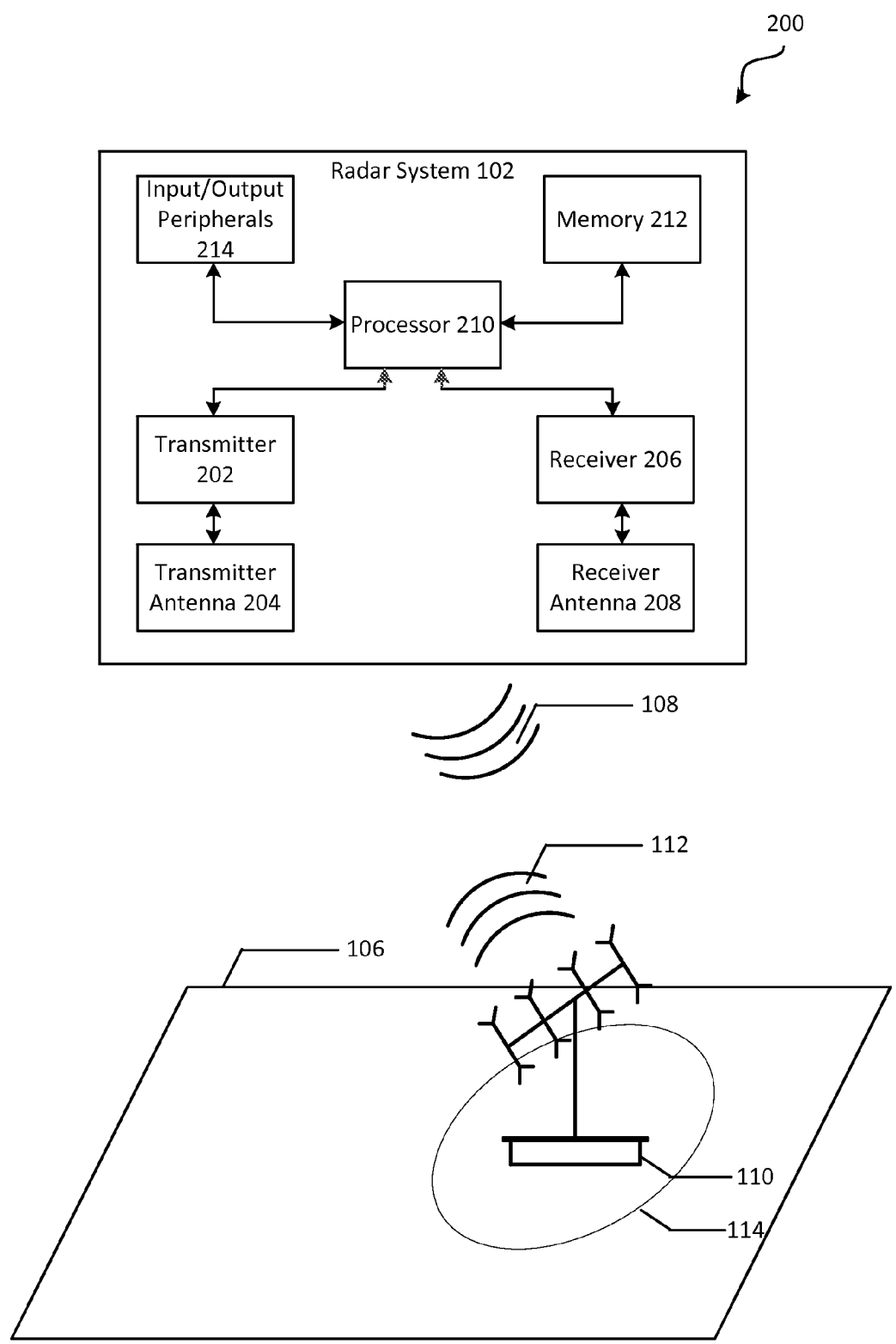
FIG. 2 is an illustration of an example system for implementing SAR imaging techniques in accordance with an embodiment of the disclosure.

Some or all elements of the radar system 102 may be implemented using circuitry 200 of FIG. 2, which illustrates an example embodiment for implementing SAR imaging techniques in accordance with the present disclosure. The term circuitry used throughout can include hardware components such as transmitters, receivers, microprocessors, application specific integrated circuits, processors, and the like. The term circuitry can also include a combination of hardware and software. One having ordinary skill in the art may write source code embodying logic that is subsequently compiled into machine readable code that can be executed by hardware.

FIG. 2 illustrates a system 200 that may include at least a transmitter 202, a transmitter antenna 204, a receiver 206, a receiver antenna 208, a processor 210, a memory 212, and input/output (I/O) peripherals 214. The transmitter antenna 204 and the receiver antenna 208 may be combined in a single antenna by way of, for example, a duplexer (not shown in FIG. 2). Additionally, an array of antennas, transmitters, and receivers may be implemented.

The transmitter 202 may be configured to generate electromagnetic signals at different frequencies, e.g., the pulses of radio waves 108, while the transmitter antenna 204 is configured to radiate these signals. In an example embodiment, the transmitter 202 includes a waveform generator and a power amplifier to generate the signals described in FIGS. 3 through 5B and FIG. 8. The reflected pulses of radio waves 112 are collected by the receiver antenna 208 and are routed to the receiver 206. The receiver 206 is configured to filter and amplify these signals for further processing. This processing includes, for example, interpretation, storage, and displaying data at a user interface of the I/O peripherals 214. Further details about the receiver 206 and its functions are described in FIGS. 6 through 8 herein below.

Various parameters of the radiated signals and various parameters for processing the received signals can be controlled by the processor 210 based on instructions that are stored in the memory 212. These parameters and other functions implemented by the processor 210 are further described herein below with reference to FIGS. 3 through 8. The memory 212 may include computer readable storage media, such as RAM, ROM, EEPROM, hard-drives, CD-ROMs, optical storage devices, magnetic storage devices, flash memory, and other tangible and non-transitory storage media. Any of such computer readable storage medium can be configured to store instructions or program codes embodying aspects of the disclosure.

Further, the memory 212 may include an operating system and applications. The processor 210 may be configured to execute the stored instructions and can comprise, for example, a logical processing unit, a microprocessor, a digital signal processor, and the like. The I/O peripherals 214 may include user interfaces such as a keyboard, screen, microphone, speaker, other input/output devices, and computing components such as digital-to-analog and analog-to-digital converters, graphical processing units, serial ports, parallel ports, universal serial bus, signal generators, filters, signal processors, and the like. The I/O peripherals 214 may also be configured to facilitate communication between the system 200 and other computing devices over a communications network and may include, for example, a network interface controller, modem, various modulators/demodulators and encoders/decoders, wireless and wired interface cards, and the like.

The radar system 102 of FIG. 1 as embodied in the system 200 of FIG. 2 or any other circuitry may be configured to achieve frequency diversity over a large frequency bandwidth associated with the transmitted pulses of radio waves 108. The size, dimensions, etc. of the object 110 may be known or approximated, but its location in the area 106 may be unknown. This information may be used to configure the radar system 102 by setting, for example, its range resolution to approximate the size or dimensions and the PRI based on the unambiguous range and Doppler coverage. To detect the object 110, the radar system 102 may illuminate the area 106 with a large frequency bandwidth to cause a resonance retroreflection from the object 110 at a frequency within the bandwidth. The likelihood of causing the resonance retroreflection may be increased when frequency diversity is used. The use of a statistically large number of frequency channels, such as twenty frequency bands to one hundred fifty frequency bands, spaced at a predefined interval (e.g., a predefined frequency interval that specifies an interval between two frequency bands that are consecutive), such as the reciprocal of the range resolution time interval, may achieve this frequency diversity. A larger number of frequency channels may be used but may not necessarily or substantially improve the performance of the radar system 102. Likewise, a smaller number of frequency channels may also be used but may reduce the likelihood of causing the resonance retroreflection. Thus, instead of relying on a high resolution image or map to detect the object, the radar system 102 may use a large number of low resolution SAR maps (e.g., twenty synthetic aperture radar maps to one hundred fifty synthetic aperture radar maps), each of which may be associated with a frequency band, and the total of frequency bands may span a large bandwidth.

Put in other words, the radar system 102 may be configured such that its range resolution may match or approximate the physical extent or resonant structure of the object 110 and such that it may achieve a frequency diversity great enough to find at least one resonant peak of the object 110. Returning to the example of FIG. 1, where the object is a sixty-six foot array of VHF antennas, the range resolution may be set to sixty-six feet and with an approximate pulse bandwidth of 7.5 MHz. Also, a plurality of frequency channels may be generated and selected such that the total, or sum, of the frequency channels or frequency bands covers a major fraction of an octave (e.g., a half octave of bandwidth) and such that each frequency channel is associated with a SAR map. The bandwidth of each frequency channel may be uniform across the plurality of frequencies. For example, if the seventh harmonic of an antenna whose operating frequency is 200 MHz is to be chosen for the SAR mapping band, the octave centered on 1.4 GHz ranges from approximately 933 MHz to 1.866 GHz. A half octave centered on 1.4 GHz would range from approximately 1.166 GHz to 1.633 GHz for a total frequency diversity bandwidth of 467 MHz. In that bandwidth there would be 467 MHz/7.5 MHz independent maps or approximately 62 maps. The plurality of SAR maps may be interleaved or may be generated over a short period of time, such as one minute or less, to simplify motion compensation and image rectification. Thus, this configuration of the radar system 102 may detect resonances of relatively large structures of unknown orientations by using a large bandwidth and frequency diversity that may give rise to larger variations from each scatterer in a SAR map as compared to traditional SAR mapping techniques. The plurality of SAR maps may be processed to detect large amplitude deviations, or speckle, that are associated with the resonances. In comparison, traditional SAR mapping techniques may use four or less frequency diverse maps for averaging to reduce map speckle because of diminishing return in speckle reduction. These traditional techniques may have a goal of reducing speckle by way of the frequency diversity and, as a result, may require the frequency channels to be at least the transmitted pulse bandwidth apart. For instance, these traditional techniques may require the frequency channels to be approximately 7.5 MHz apart for a sixty-six foot range resolution which may require a total bandwidth of (4×7.5) MHz or 30 MHz.

Figure 3:
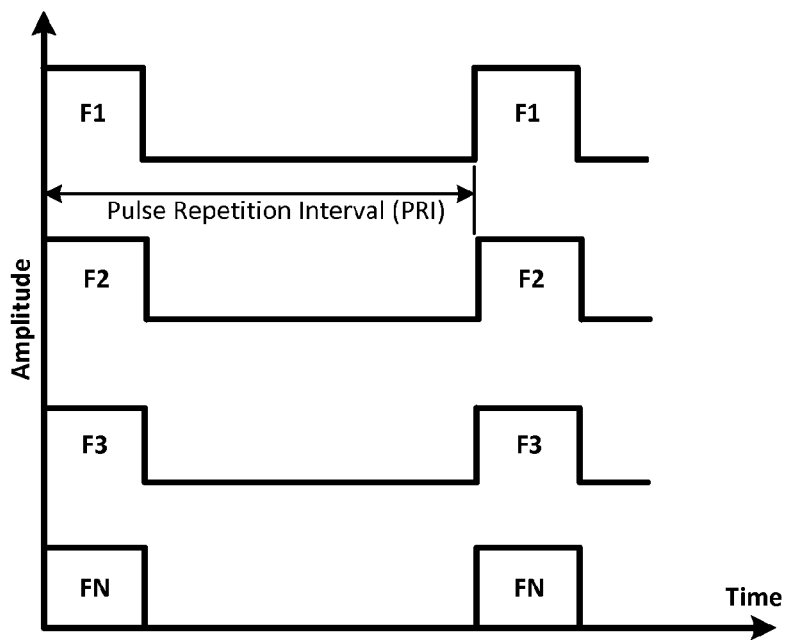
FIG. 3 is an illustration of an example transmission scheme in accordance with an embodiment of the disclosure.

The radar system 102 may also be configured to illuminate the area 106 by simultaneously or near simultaneously radiating the multi-frequency spectrum covering the frequency band that may likely contain antenna resonances associated with the object 110. The pulse radio waves 108 may be modulated based on a stacked frequency transmission scheme as shown in FIG. 3 to generate a stack of pulse waveforms such that each pulse waveform may be associated with a frequency band. The N frequencies may be transmitted at once during a single pulse (e.g., for a simultaneous transmission) and may be repeated at each pulse repetition interval.

Figure 4:
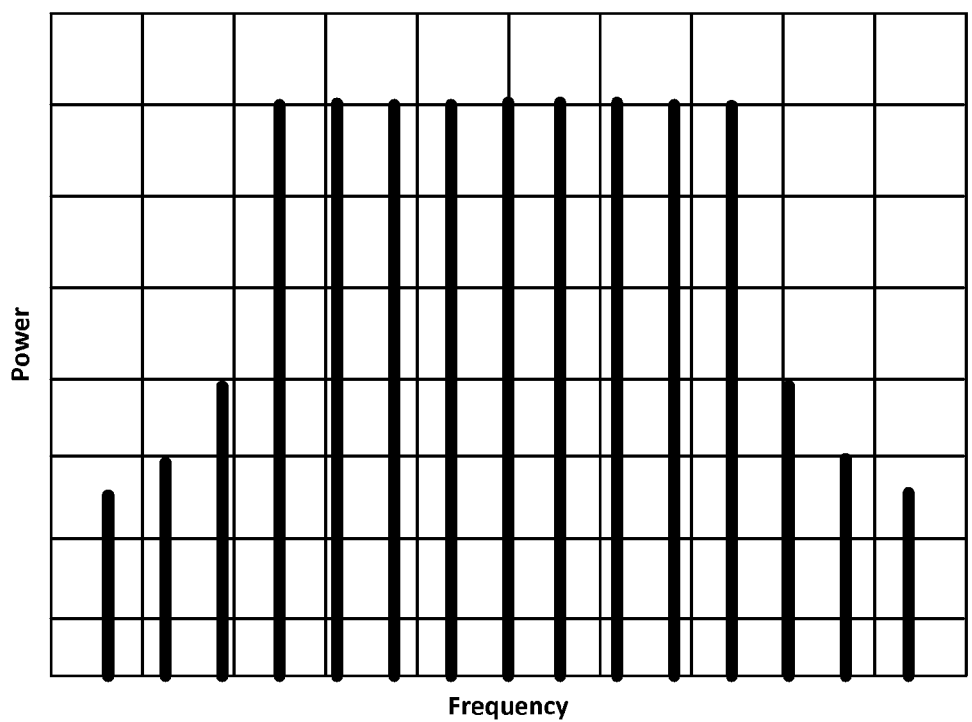
FIG. 4 is an illustration of a power spectrum of an example transmission scheme in accordance with an embodiment of the disclosure.

FIG. 4 illustrates an example power spectrum of a nine-frequency stacked frequency transmission scheme that is not modulated by the transmitted pulse. A frequency modulation can be used to generate almost any odd number of spectral lines of almost equal amplitude (although FIG. 4 illustrates nine spectral lines, the modulation is not limited to that number). The frequency modulation equation may be given as:

$$r(t) = \sin\left(2\cdot\pi\cdot f_0 + \beta\cdot\sum_{n=0}^{N}\sin(3^n\cdot 2\cdot\pi\cdot f_m\cdot t + \alpha_n)\right)$$

where α is the modulation phase, β is the modulation index, $f_0$ is the carrier frequency, $f_m$ is the modulation frequency, and N is the number of frequency channels.

Figure 5A:
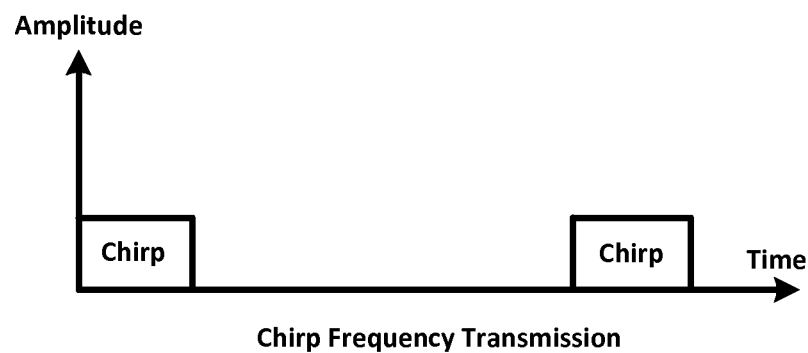
FIGS. 5A and 5B are illustrations of another example transmission scheme in accordance with an embodiment of the disclosure.
Figure 5B:
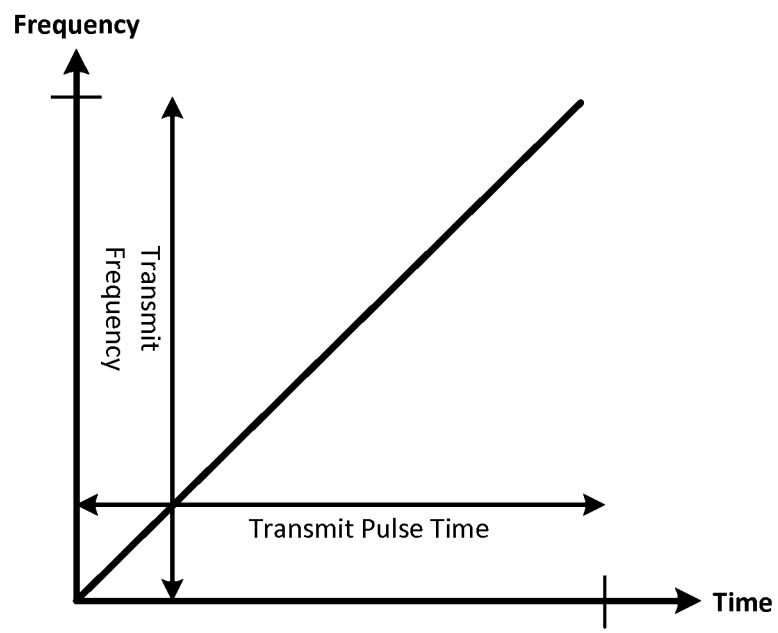

Once pulse modulation is applied, the spectrum may be filled in fully by the modulation. Alternatively, the pulse modulation may also use phase modulation to generate a pulse compression waveform which can be a chirp waveform or a phase code with desirable sidelobe properties such as a Barker, P, or Frank code. FIGS. 5A and 5B illustrate an embodiment that uses a chirp waveform that covers the frequency bands to fill in the spectrum. This chirp waveform may be pulsed in conjunction with the modulation described above, but, in place of simultaneously or nearly simultaneously stacked frequencies, the N frequencies may be visited in sequence. Also, stretch range compression may be used within a frequency excursion to achieve the range resolution. The transmitted chirp can produce frequency diversity as in the above embodiment. Which transmission scheme to use is an implementation that one skilled in the art may make based on various parameters. For example, if an existing radar system already employs chirp waveforms and is being modified to implement the techniques of this disclosure, one skilled in the art may select this type of waveform to minimize the change to the radar system. On the other hand, if flexibility in pulse repetition frequency (PRF) and pulse width are desired, one skilled in the art may select the stacked frequency transmission.

Figure 6:
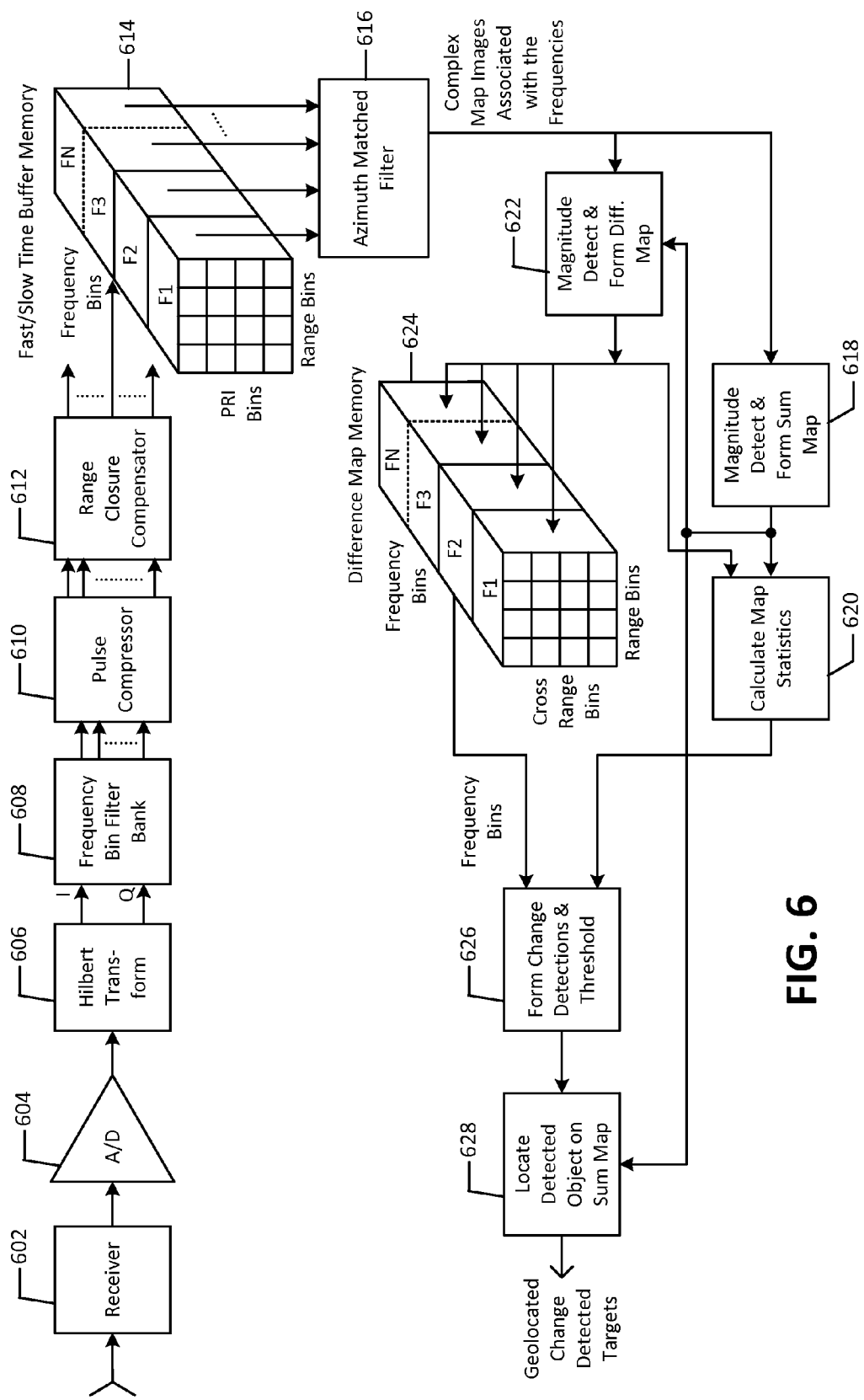
FIG. 6 is an illustration of an example system for detecting an object in accordance with an embodiment of the disclosure.

Once the N frequencies are modulated and transmitted, the radar system 102 may receive and process the pulses of radio waves 112 that may be reflected from the object 110. FIG. 6 illustrates an example embodiment of circuitry that may be implemented to receive the pulses of radio waves 112, to generate the SAR maps, and to detect the object 110 based on a resonant peak through a statistical correlation of the SAR maps. On reception, the spectrum may be converted to a convenient intermediate frequency and digitized. Subsequent filter processing, image formation, summation, and differencing may be performed in one or more signal processors or circuitry configured to execute vector arithmetic, bulk memory storage, and image processing.

The circuitry may include a receiver 602 that may have amplification, gain control, and filters to reduce noise figure and to present a mean amplitude to an analog to digital (A/D) converter 604. Subsequent to A/D conversion, the data may be converted to in-phase and quadrature digital data by way of Hilbert transform 606 techniques. This results in a digitized spectrum that can be expressed by way of bins, each of which may represent content of the corresponding spectrum. The digitized spectrum for each pulse may be separated in a filter bank 608 by each transmitted frequency bin. Often subsequent to frequency binning, the filter outputs may be at baseband and may be sub-sampled to near a range bin rate. The range bins for each of the N or multiplicity of stacked frequencies for each PRI may be pulse compressed through a pulse compressor 610 to achieve the range resolution. The range resolution, as previously stated, may be matched or approximated to the extent of the object 110. In an embodiment, each of the frequency bins may be associated with one of the transmitted frequency bands such that the frequency bin may collect the energy of that frequency band. Similarly, a range bin may represent the sum of values within a segment of the return signal when the receiver 602 segments the received signals based on range gates. The PRI bins each contain the sampled range data from at least one PRI. If pre-summing is used, a number of PRI's may be summed range bin by range bin in each PRI bin. The number of PRIs within a PRI bin may be set depending on the length of the PRI, the radar range, the relative velocity, the range and cross range resolution, the altitude of the receiver 602 (e.g., the platform to which the receiver is attached), and the like.

During the time of the data collection, the distance between the antenna (e.g., the receiver antenna) and the object may have changed from one PRI to the next PRI. This change may be compensated using a range closure compensator 612 if the two consecutive PRIs are a significant fraction of a range bin such as 1%. The applied range closure compensation may keep the return from a single patch on the ground in the same range bin over the time of the array used to form the desired resolution SAR map and may also compensate for range opening.

Subsequent to range closure compensation, the raw map data may be stored in a mass memory in a three-dimensional format 614 such as by range bin, by PRI bin, and by frequency bin. After collecting PRI bins for a desired cross range resolution, the data for each range bin across the PRI bins may be read out of mass storage into an azimuth matched filter 616 to generate a complex or two-dimensional focused SAR map in range and cross range for each frequency bin. This may result in a plurality of SAR maps, each corresponding to a frequency bin. Pixels across the plurality of SAR maps can be processed and compared to determine their corresponding contributions to an overall SAR map to allow detection of a resonant retroflection of the object at one or more frequencies.

For example, each SAR map for each frequency bin may be magnitude detected and cumulatively summed bin by bin using circuitry 618, and used to form a sum map for all frequencies. As the sum map is formed, the statistics of the map scene, such as mean and standard deviation for each radar pixel, may be calculated and stored using circuitry 620. Each individual map after magnitude detection may be subtracted from the sum map radar pixel by radar pixel to form the difference maps using circuitry 622. The difference maps may be stored for each frequency bin in a three-dimensional format 624 such as by range bin, by cross range bin, and by frequency bin. Each difference map may also be used to estimate the difference map statistics and to update the statistics of the map scene.

Thereafter, the difference maps may be read out of mass memory and normalized by subtracting the sum map mean in each pixel from each difference map pixel and may then be divided by the standard deviation in each sum map pixel. Circuitry 626 may weigh the result by using a threshold multiplier of a number, such as four to ten, of sum map standard deviations. This thresholding may be performed for each frequency map image to generate a set of thresholds. Threshold crossings may be noted as to range-cross range pixel number for each frequency. Using circuitry 628, the accumulated threshold crossings may be reinserted into a version of the sum map with an annotation, such as color or a numeric designation. The sum map center may usually be known in world-wide coordinates to high accuracy. Hence, a change detected may be associated with the object 110 and may be geo-located relative to the map center for further processing.

Figure 7:
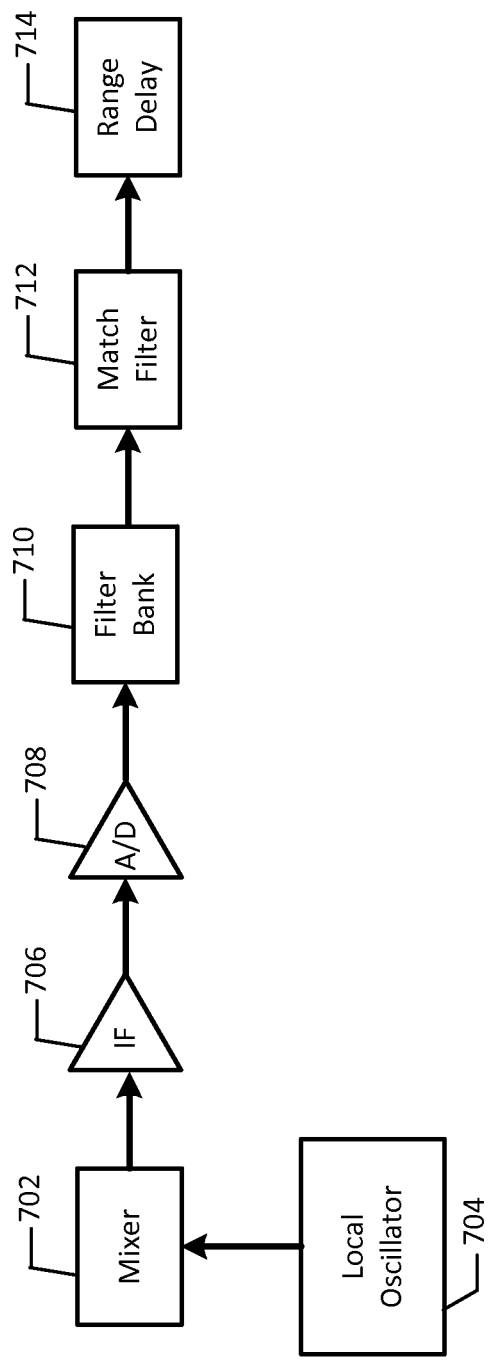
FIG. 7 is an illustration of another example system for detecting an object in accordance with an embodiment of the disclosure for the transmission scheme shown in FIGS. 5A and 5B.

When a chirp waveform is used, the front end of the circuitry shown in FIG. 6 may need to be modified as shown in FIG. 7. For example, a mixer 702 may be used to mix the received signal with a local oscillator signal originating at a local oscillator 704. The output is a wideband signal at an intermediate frequency, which is in turn input to an IF amplifier 706. The output of the IF amplifier 706 is the input of an A/D converter 708 for digitization. The digitized spectrum for each pulse may be separated by each transmitted frequency bin in a filter bank 710, which may include a fast Fourier transform (FFT) filter that may also weigh the sidelobes of the pulse. Subsequent to frequency bin filtering, a residual chirp may exist in each frequency channel. That chirp may be pulse compressed using a chirp matched filter 712 to produce a coherent range profile for each frequency bin. If a large intrapulse range skew occurs due to the chirp waveform, the range skew may be removed by a range delay 714 unique to each frequency bin. For example, when 7.5 MHz separates two successive frequency bins and the transmitted pulse is 100 microseconds with frequency deviation of 467 MHz total, there exists approximately a 1.61 microsecond skew between each frequency bin which should be removed in order for all the maps to lie on top of one another. Thus the first frequency bin may be delayed by 100 microseconds relative to the last frequency bin. Once frequency binning and deskewing are fully accomplished, the data may be processed using the components 612-628 of FIG. 6.

Figure 8:
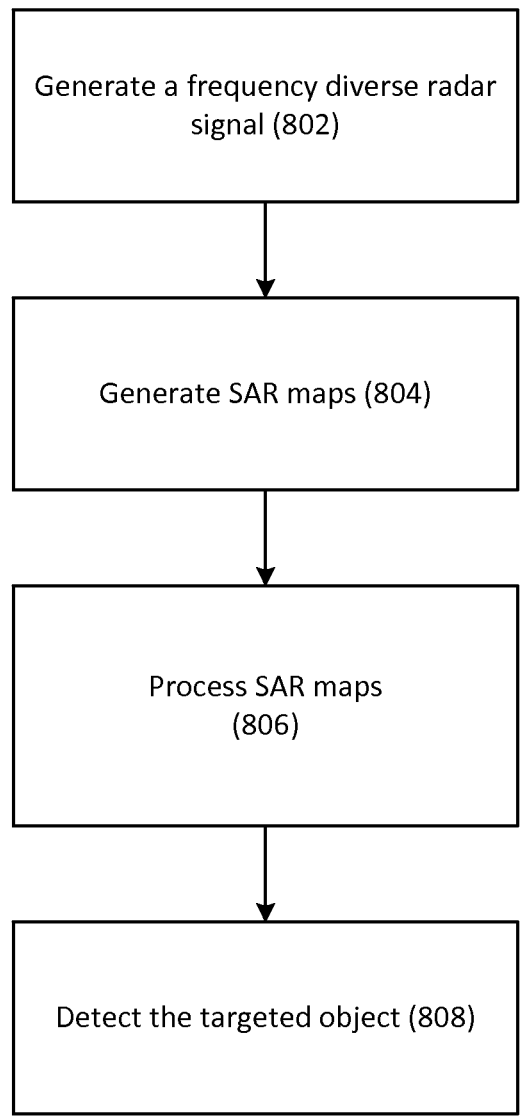
FIG. 8 is an illustration of operations performed by one embodiment in accordance with the disclosure.

FIG. 8 illustrates an example set of operations performed by a system for detecting an object, such as the radar system 102, in accordance with an embodiment of the disclosure. The outlined operations are provided as examples, and some operations may be optional, combined into fewer operations, or expanded into additional operations. Operation 802 (generate a frequency diverse radar signal) illustrates configuring the circuitry such that a radar range resolution may match or approximate dimensions of a targeted object, selecting a large or statistically sufficient number of frequency bands distanced at a reciprocal of the radar resolution from each other to cover a large bandwidth; selecting and modulating a pulse signal based on the frequency bands and the radar resolution; and illuminating an area that may contain the targeted object. This operation may also include setting a center frequency of the frequency bands to a large harmonic, such as the seventh harmonic, of the operating frequency of the targeted object. Operation 802 may be followed by operation 804. Operation 804 (generate SAR maps) illustrates the circuitry receiving signals reflected from the illuminated area over a predefined period of time, processing the received signal to generate raw data for each SAR map associated with each of the frequency bins. Operation 804 may be followed by operation 806.

Operation 806 (process SAR maps) illustrates the circuitry processing the raw data to generate an overall image of the illuminated area. A contribution of a pixel of a SAR map to a corresponding pixel of the overall image may be compared to contributions of corresponding pixels in the remaining SAR maps. For example, an amplitude contribution of a pixel of a first SAR map to a corresponding pixel of the overall image may be calculated to determine whether the pixel of the first SAR map is associated with a large amplitude deviation as compared to amplitude deviations of corresponding pixels of the remaining SAR map. When such a deviation is detected, the detection may be used as an indication of a resonant frequency associated with a retroreflection from the targeted object at the frequency band of the first SAR map. Quantifying the contribution may also or alternatively include cumulatively adding the amplitude of the pixel of the first SAR map to the amplitude of the corresponding pixel of the overall map (e.g., a pixel-by-pixel cumulative addition of amplitudes of pixels across the plurality of SAR maps). This amplitude contribution may be averaged or normalized before or after being added to the amplitude of the pixel of the overall map. The averaging and normalization may use statistics associated with the first SAR map, the remaining SAR maps, and the overall image.

The overall image may be generated by applying a non-coherent summation of a number, such as all or eighty percent or any other suitable percent, of the SAR maps to form a sum image and to determine statistics of the sum image such as a mean and a standard deviation for each radar pixel of the sum image. The sum image may be normalized based on the statistics to form an average map. A difference map may be generated for each frequency band by differencing the average map and the corresponding SAR map. Pixels of the difference maps may be normalized by subtracting the sum map pixel mean from each pixel and normalizing the result by the sum map standard deviation to generate normalized difference maps. Values of these pixels for each difference may be set as the contributions of the pixels or of the corresponding SAR map to the overall image. Operation 806 may also apply a threshold multiplier based on a number, such as four to ten, of the difference map standard deviations to remove pixels in the normalized difference maps to minimize false alarms. Additional pixels in the normalized difference maps may also be censored by applying, for example, traditional coherent detection techniques to pixels in a SAR map to detect irregular pixels and filtering the corresponding pixels in the corresponding difference maps.

Operation 806 may be followed by operation 808. Operation 808 (detect the targeted object) illustrates geo-locating the targeted object in the sum map or in world-wide coordinates such as latitude, longitude, and altitude. For example, threshold crossings under operation 808 may be noted as to range and cross-range pixel number for each frequency to determine range and cross-range crossings. The threshold crossings may be accumulated across the frequency bands and the accumulated threshold crossings may be reinserted into a version of the sum map with annotations to reflect a geographical location of the targeted object.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

We claim:

1. A detection system comprising:
radar transmitter circuitry configured to transmit a first signal representative of a plurality of frequency bands, each frequency band being at an interval from another frequency band based on a range resolution, the plurality of frequency bands forming a bandwidth that causes a variation of a scatterer in a radar map;
radar receiver circuitry configured to generate a plurality of synthetic aperture radar maps based on a second signal representative of a reflection of the first signal, each synthetic aperture radar map of the plurality of synthetic aperture radar maps being associated with a frequency band from the plurality of frequency bands; and
signal processing circuitry configured to detect a target object based on a first synthetic aperture radar map representative of the plurality of synthetic aperture radar maps and a contribution of a second synthetic aperture radar map of the plurality of radar maps to the first synthetic aperture radar map.

2. The detection system of claim 1, wherein the range resolution is determined based on a dimension of the target object, wherein the interval between two frequency bands is a reciprocal of the range resolution time interval, wherein the plurality of frequency bands comprises at least twenty frequency bands, wherein the plurality of frequency bands covers a major fraction of an octave of bandwidth, and wherein the frequency bands are selected to increase a likelihood of a retroflection from the target object at a resonant frequency.

3. The detection system of claim 2, wherein a selected frequency band from the plurality of frequency bands is set at a harmonic of an operating frequency of the target object.

4. The detection system of claim 2, wherein the plurality of synthetic aperture radar maps is generated in a time period that accounts for motion compensation and image rectification.

5. The detection system of claim 2, wherein the contribution of the second synthetic aperture radar map to the first synthetic aperture radar map is determined based on a pixel by pixel cumulative addition of amplitudes of pixels associated with the second synthetic aperture radar map to amplitudes of pixels associated with the first synthetic aperture radar map, wherein the addition is normalized based on statistics associated with the first synthetic aperture radar map and second synthetic aperture radar map.

6. The detection system of claim 1, wherein the first synthetic aperture radar map is based on an average and a standard deviation of the plurality of synthetic aperture radar maps, and wherein the contribution of the second synthetic aperture radar map to the first synthetic aperture radar map is determined based on a normalization of a difference between the second synthetic aperture radar map and the first synthetic aperture radar map, wherein the normalization is based on the standard deviation of the plurality of synthetic aperture radar maps.

7. The detection system of claim 6, wherein the contribution is further determined by applying a set of thresholds to the difference between the second synthetic aperture radar map and first synthetic aperture radar map to generate range and cross-range crossings and inserting the range and cross-range crossings in the first synthetic aperture radar map, wherein the set of thresholds is based on a standard deviation associated with the difference.

8. The detection system of claim 1 further being mounted on an aircraft or spacecraft platform, wherein the target object comprises a non-radiating array antenna.

9. A method of generating a synthetic aperture radar image, the method comprising:
   determining a range resolution based on a dimension of a passive target;
   determining a number of frequency bands based on a predetermined frequency diversity, each frequency band being at an interval from another frequency band based on the range resolution;
   transmitting a signal at a pulse repetition interval, the signal being based on the number of frequency bands; and
   causing the synthetic aperture radar image to be generated based on a plurality of processed synthetic aperture radar images in response to the transmitted signal, each processed synthetic aperture radar image of the plurality of processed synthetic aperture radar images being associated with a frequency band from the number of frequency bands.

10. The method of claim 9, wherein the number of frequency bands causes a generation of a resonant peak associated with a retroreflection of the passive target.

11. The method of claim 9, wherein the range resolution is adjusted to match a size of the passive target.

12. The method of claim 9, wherein the signal is based on a stack of pulse waveforms, wherein each pulse waveform is associated with a frequency band from the number of frequency bands, and wherein the pulse waveforms are modulated in the signal for simultaneous transmission.

13. The method of claim 9, wherein the signal is based on a chirp waveform that covers the frequency bands.

14. The method of claim 9, wherein the number of frequency bands is in a range of twenty to one hundred fifty, and wherein the frequency bands cover a major fraction of an octave of bandwidth.

15. The method of claim 9, further comprising:
   generating a plurality of radar-based maps, each radar-based map spanning a frequency band that is at a predefined interval from a frequency band associated with another radar-based map, the plurality of radar-based maps mapping an area within a predefined duration; and
   determining a resonance or quasi-resonance retroreflection associated with an object based on a comparison of the plurality of radar-based maps.

16. The method of claim 15, wherein the plurality of radar-based maps comprises at least twenty synthetic aperture radar maps.

17. The method of claim 15, wherein the predefined frequency interval is a reciprocal of a desired range resolution time interval.

18. The method of claim 15, wherein the predefined duration is less than a minute.

19. The method of claim 15, wherein the retroreflection is resonant at a frequency band associated with a radar-based map from the plurality of radar-based maps.

20. The method of claim 15, wherein the comparison comprises a summation of the plurality of radar-based maps, a determination of an average map based on the summation, a subtraction of each radar-based map from the average map to form a difference map associated with each radar-based map, a normalization of each difference map to form a plurality of normalized difference maps, a determination of a plurality of thresholds based on a number of normalized difference maps from the plurality of normalized difference maps, a determination of a plurality of crossings based on comparisons of pixels of the normalized difference maps and the plurality of thresholds, and an insertion of the crossings into the summation of the plurality of radar-based maps.

* * * * *